United States Patent [19]
Detwiler

[11] Patent Number: 6,045,045
[45] Date of Patent: Apr. 4, 2000

[54] OFFSET BARCODE SCANNER

[75] Inventor: Paul O. Detwiler, Lawrenceville, Ga.

[73] Assignee: NCR Corporation, Dayton, Ohio

[21] Appl. No.: 09/115,090

[22] Filed: Jul. 14, 1998

[51] Int. Cl.[7] .................................................. G06K 7/10
[52] U.S. Cl. ...................................... 235/467; 235/472.01
[58] Field of Search ................................. 235/467, 472.01

[56] References Cited

U.S. PATENT DOCUMENTS

| | | |
|---|---|---|
| 4,851,667 | 7/1989 | Mergenthaler et al. . |
| 4,870,274 | 9/1989 | Hebert et al. . |
| 5,202,784 | 4/1993 | Reddersen . |
| 5,216,232 | 6/1993 | Knowles et al. . |
| 5,229,588 | 7/1993 | Detwiler et al. . |
| 5,233,171 | 8/1993 | Baldwin . |
| 5,357,094 | 10/1994 | Baldwin . |
| 5,357,101 | 10/1994 | Plesko . |
| 5,371,347 | 12/1994 | Plesko . |
| 5,498,862 | 3/1996 | Edler . |
| 5,555,125 | 9/1996 | Peng . |
| 5,591,954 | 1/1997 | Spencer . |
| 5,627,366 | 5/1997 | Katz . |
| 5,969,323 | 10/1999 | Gurevich et al. .................. 235/472.01 |

*Primary Examiner*—Harold I. Pitts
*Attorney, Agent, or Firm*—Francis L. Conte

[57] ABSTRACT

A barcode scanner includes a laser for projecting a laser beam in an outbound path at a barcode, and effecting back scattered light therefrom in an opposite inbound path. A focusing lens is optically aligned with the laser in both the outbound and inbound paths, and has an optical axis laterally offset from the laser. A detector is laterally offset from the laser and optically aligned with the lens for receiving the scattered light therefrom.

13 Claims, 3 Drawing Sheets

OFFSET BARCODE SCANNER

BACKGROUND OF THE INVENTION

The present invention relates generally to barcode scanners, and, more specifically, to light collection systems therein.

A typical laser barcode scanner is configured to scan an outbound laser beam across a barcode, and decode the inbound back scattered light therefrom. A typical one-dimensional barcode in accordance with the Universal Products Code (UPC) includes a series of alternating dark bars and white spaces of varying width for encoding data. As the laser beam scans across the barcode, light is reflected from the white spaces and absorbed by the dark spaces to modulate the back scattered light, which may then be suitably demodulated or decoded.

The laser beam is segmented into scan lines by reflection from a mirrored spinner, which scan lines are projected against the barcode either directly or upon reflection from one or more pattern mirrors. As the scan lines traverse the barcode, light is typically back scattered into a hemisphere or cone perpendicular to the barcode. In order to read the barcode, some of the scattered light must be collected by the scanner and converted into electrical energy which is suitably decoded. The inbound collection path of the scanner is typically identical in most part with the outbound scanning path but in reverse order. The spinner, therefore, not only scans the laser beam in the outbound path, but also descans the back scattered light in the inbound path, which may then be decoded.

However, since the outbound and inbound optical paths are substantially identical or coextensive, the inbound scattered light must be suitably separated from the outbound laser beam and imaged onto a photodetector for conversion into electrical energy.

The collection system for the inbound light therefore adds to the complexity and cost of the scanner. A typical collection system includes a mirror with a bypass hole therethrough which allows the outbound laser beam to pass through the hole without deviation while deflecting the inbound light to the photodetector, typically also using a focusing lens therebetween. Mirrors are relatively expensive to manufacture since they require precision light reflecting surfaces thereon. The location of the photodetector is controlled by the available location of the collection mirror which typically positions the photodetector remote from the laser in different areas and on different printed circuit (PC) boards.

Accordingly, it is desired to simplify the collection path in a barcode scanner for reducing complexity of the scanner, space requirements, and cost.

SUMMARY OF THE INVENTION

A barcode scanner includes a laser for projecting a laser beam in an outbound path at a barcode, and effecting back scattered light therefrom in an opposite inbound path. A focusing lens is optically aligned with the laser in both the outbound and inbound paths, and has an optical axis laterally offset from the laser. A detector is laterally offset from the laser and optically aligned with the lens for receiving the scattered light therefrom.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENTS

Figure 1:
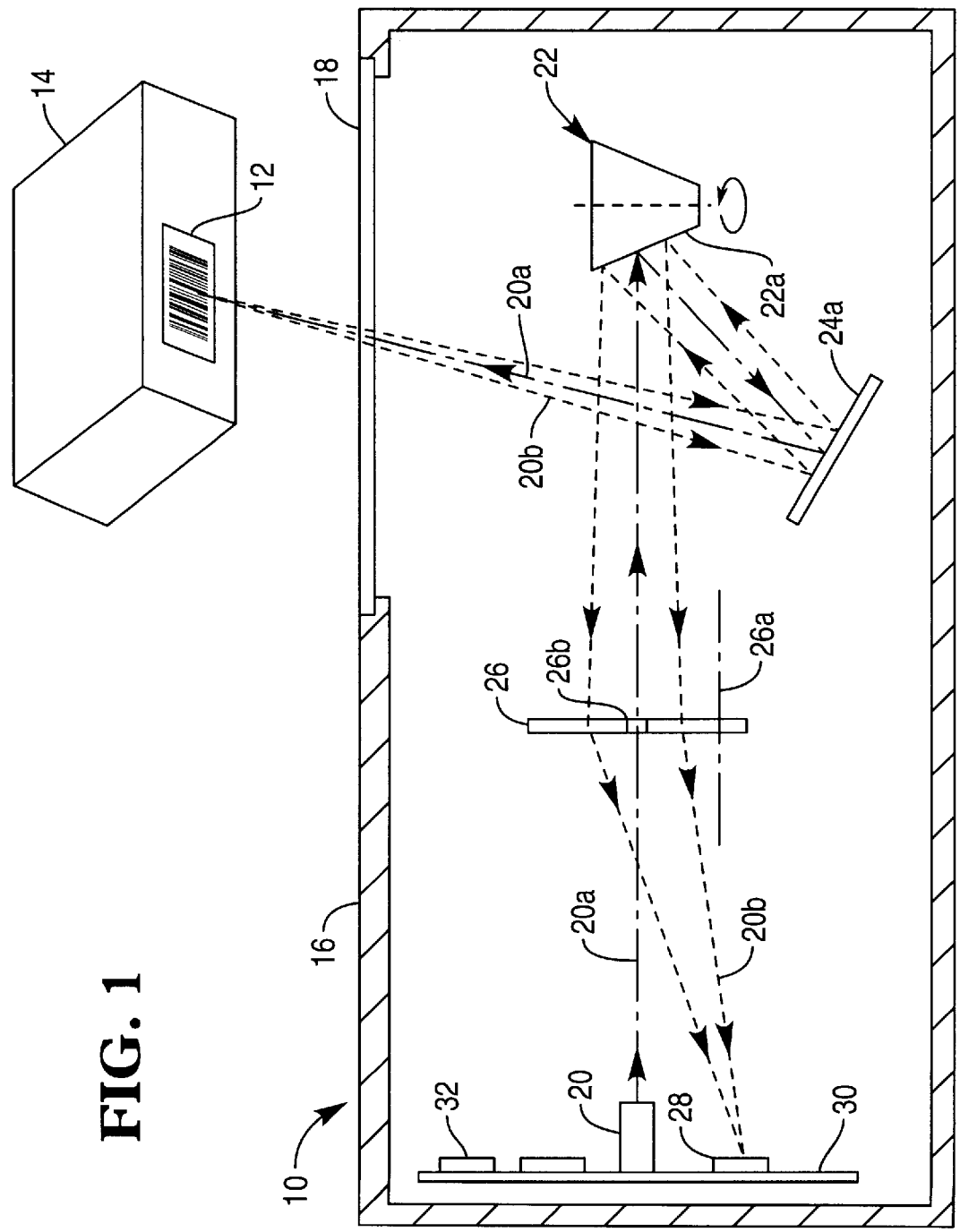
FIG. 1 is a schematic, elevational view of a barcode scanner in accordance with an exemplary embodiment of the present invention including a laterally offset collection lens therein.

Illustrated schematically in FIG. 1 is a scanner 10 for scanning a barcode 12, such as that typically found on a retail package 14. The barcode 12 may take any conventional form such as the UPC barcode identified above as including alternating dark bars and white spaces of varying width for encoding data therein.

The scanner 10 is in the exemplary form of a stationary model having a suitable housing 16 for mounting the components thereof in any orientation such as vertical or horizontal. In the horizontal configuration illustrated in FIG. 1, the housing includes a horizontal window 18 above which the package and barcode are positioned for scanning.

The scanner 10 includes means in the form of a laser 20 for projecting or emitting a laser beam 20a shown in phantom line in an outbound optical path at the barcode 12, and effecting back scattered light 20b therefrom shown in dashed line in an opposite inbound optical path. The laser 20 has a laser projection axis along which the laser beam 20a is projected in a straight line.

In the exemplary embodiments illustrated in FIG. 1, the outbound path includes a rotary spinner 22 and one or more pattern mirrors identified by the prefix 24 optically aligned with the spinner 22 in a conventional configuration for segmenting the laser beam 20a in segmented scan lines in a crossing pattern which is projected through the window 18 for illuminating the barcode 12. As shown in more detail in FIG. 2, the spinner 22 has a plurality of mirrored facets 22a, three for example, which are rotated by an internal motor. The spinner is optically aligned with the laser 20 for periodically or sequentially reflecting the laser beam 20a along a spinning outbound path effected by the spinner 22.

Figure 2:
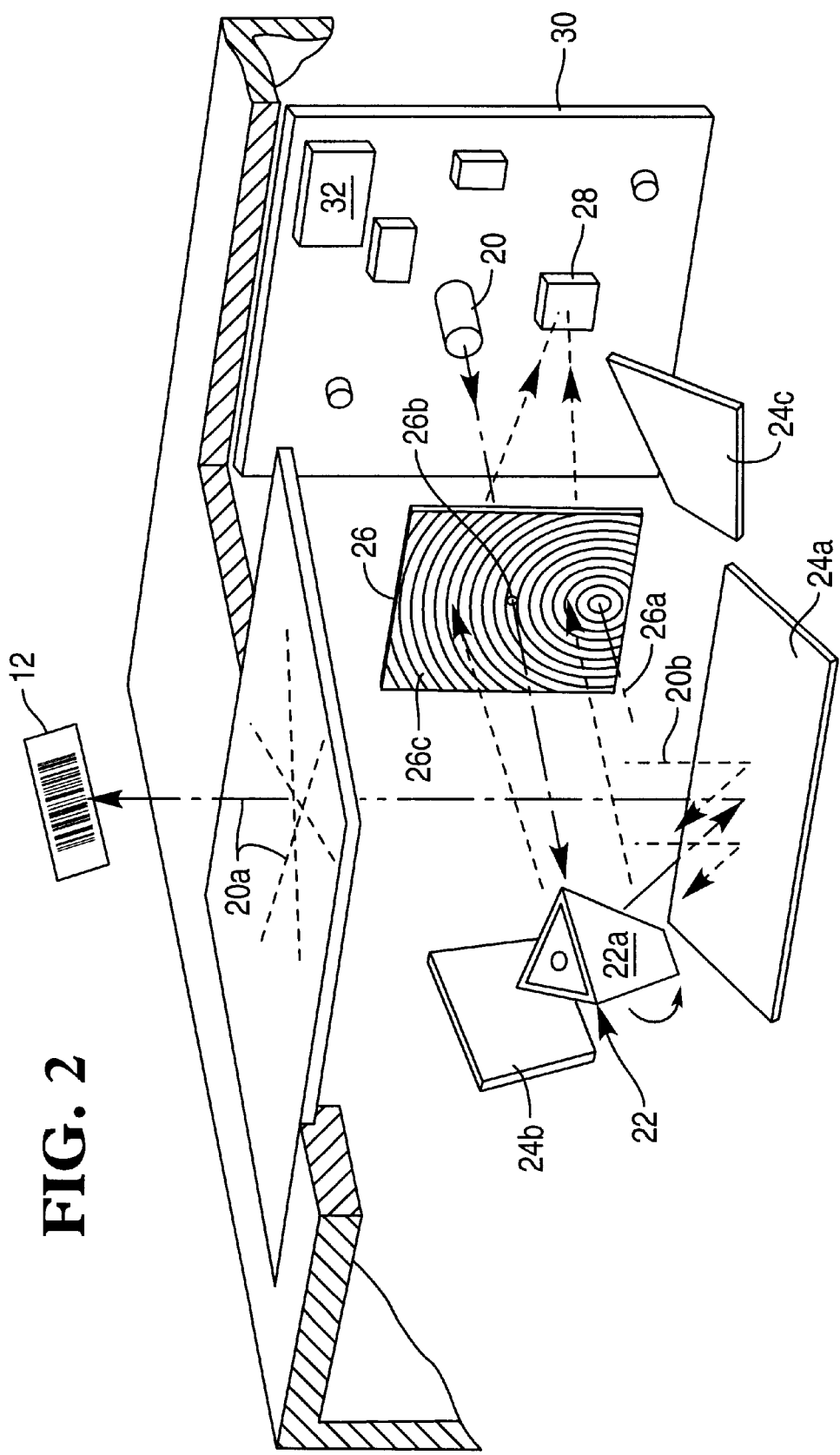
FIG. 2 is an isometric view of the scanner illustrated in FIG. 1 including a fresnel collection lens in accordance with an exemplary embodiment of the present invention.

Three exemplary pattern mirrors 24a,b,c are illustrated in FIG. 2 as cooperating with the three facet spinner 22 to sequentially produce crossing scan lines to illuminate the barcode 12. The pattern mirrors 24 additionally reflect the laser beam 20a initially reflected from the spinner 22 to correspondingly effect the scan lines which traverse the barcode 12. The spinner facets 22a are typically mounted at different inclination angles for correspondingly producing different scan lines from the individual pattern mirrors to effect a collective scan line pattern once per revolution of the spinner 22.

As shown at an instantaneous point in time in FIG. 1, the laser beam 20a in the outbound path reflects firstly off the spinner 22 and secondly off one of the pattern mirrors 24 and is steered through the window 18 for traversing the barcode 12. The back scattered light 20b is reflected from the barcode 12 in an outwardly diverging cone, some of which light follows the outbound path in reverse order reflecting firstly off the corresponding pattern mirror 24 and secondly off the spinner 22 toward the laser 20 from which the original laser beam 20a was emitted. Accordingly, the outbound and inbound optical paths between the laser 20 and barcode 12 are substantially identical and in most part coextensive or parallel.

In a conventional scanner, the inbound light 20b would be separated from the outbound beam 20a between the laser 20 and the spinner 22 typically by using an inclined mirror having a bypass hole therethrough through which the laser beam 20a is transmitted to the spinner 22, with the mirror steering the inbound scattered light 20b away from the laser beam for subsequent decoding. As indicated above, however, such a collection mirror and associated optics increase complexity of the scanner, increase space requirements, and increase the cost thereof.

In accordance with the present invention, a relatively simple and inexpensive collection lens 26 as shown in FIGS. 1 and 2 is used instead of a diverting collection mirror. The collection lens 26 is a positive focusing lens optically aligned with the laser 20 in both the outbound and inbound optical paths, and includes an optical centerline axis 26a which is laterally offset from the laser 20 and its coincident projection axis and beam. A photodetector 28 is laterally offset from the laser 20, and is optically aligned with the lens 26 for receiving the inbound scattered light 20b therefrom.

The collection lens 26 preferably includes a bypass hole 26b extending completely therethrough and laterally offset from the optical axis 26a. The bypass hole 26b is optically aligned with the laser 20 in both the outbound and inbound optical paths to pass the laser beam 20a outbound without deviation or obstruction, with the collection lens being effective for focusing the inbound scattered light 20b onto the detector 28.

In this way, the laser beam 20a is projected in its outbound path at the barcode 12 to back scatter the light 20b therefrom in an opposite inbound path. The inbound light 20b is focused by the lens 26 laterally offset from the laser beam 20a for separation therefrom. The detector 28 produces a corresponding electrical signal from the detected offset scattered light 20b impinging thereon from the lens 26 which may be suitably decoded.

In the preferred embodiment illustrated in FIG. 1 and 2, the laser 20 and detector 28 are mounted on a common support 30 such as a printed circuit (PC) board, with the detector 28 being laterally offset from the laser 20. The PC board 30 includes various electronic components for operating the scanner in a conventional manner. For example, an electrical processor or decoder 32 may also be mounted on the common PC board 30 and is operatively joined to the photodetector 28 for receiving electrical signals therefrom and decoding those signals for in turn decoding the barcode 12.

Figure 3:
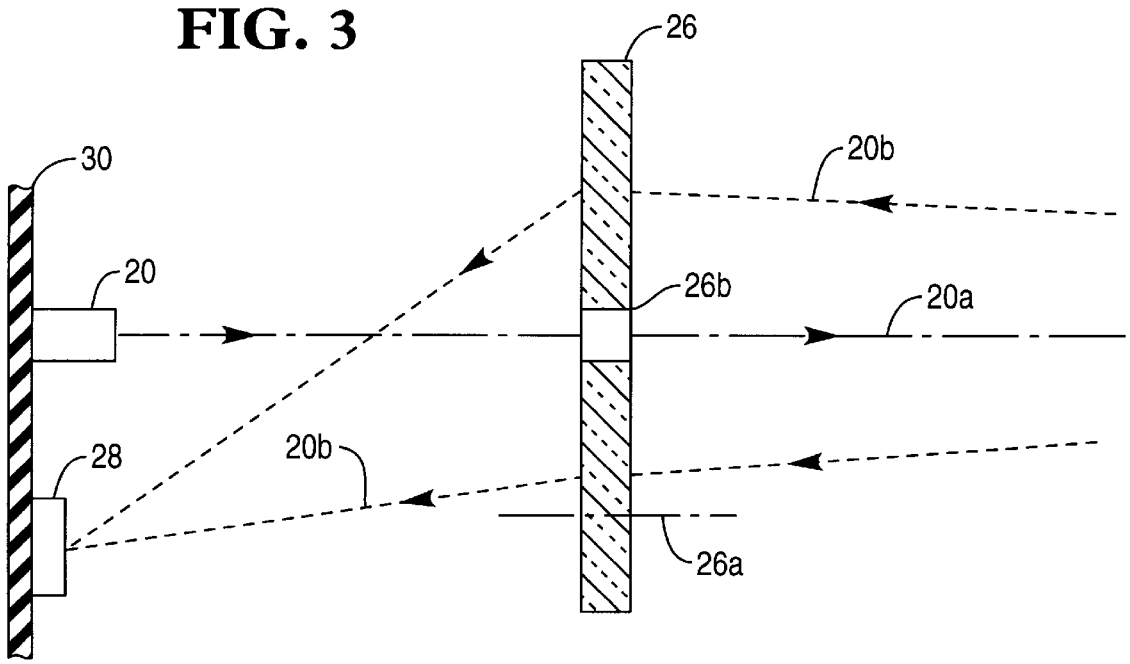
FIG. 3 is an enlarged view of the collection lens and cooperating laser and photodetector illustrated in FIG. 1.

The collection lens 26 is illustrated in more particularity in FIG. 3 with its preferred cooperation with the laser 20 and detector 28 on the common PC board 30. The bypass hole 26b is optically aligned with the laser 20, and the lens 26 is laterally offset from the laser 20 downwardly toward the detector 28.

In this exemplary configuration, the optical axis 26a of the lens 26 is parallel with both the laser 20 and its projection or beam axis, but laterally or perpendicularly offset therefrom. Since the collection lens 26 is a focusing lens, the inbound scatter light 20b is focused radially inwardly toward the optical axis 26a. This focusing performs two substantial functions in both separating the inbound light 20b from the outbound beam 20a, and imaging the inbound light on the detector 28 for the decoding thereof. Instead of using a conventional collection mirror and associated optics, the single collection lens 26 may be used to advantage with its lateral offset alignment to simplify the scanner configuration and its cost. Lenses are considerably less expensive to manufacture than mirrors, and since the detector 28 merely measures intensity of the inbound light 20b the accuracy and focusing ability of the lens 26 does not require precision.

As shown in FIG. 3, the collection lens 26 now allows the detector 28 to be mounted on the same PC board 30 as that of the laser 20 for further reducing the complexity and cost of the scanner, with the detector 28 being suitably offset laterally from the laser 20 and the lens 26. The detector 28 is laterally offset at least in part radially from the lens optical access 26a, diametrically opposite to the bypass hole 26b, for receiving the focused inbound light 20b from the lens 26. The offset distance between the detector 28 and the laser 20 depends upon the lateral magnification of the lens 26, and may be readily altered by changing the offset of the collection lens 26 relative to the laser 20.

In the exemplary embodiment of the collection lens 26 illustrated in FIGS. 1–3, the lens is in the form of a conventional fresnel lens which includes a plurality of concentric prismatic grooves 26c disposed coaxially with the optical axis 26a. The bypass hole 26b is spaced radially outwardly or outboard from the optical axis 26a. The fresnel lens 26 is a single element which may be injection molded from inexpensive thermoplastic. The fresnel lens 26 may be relatively thin and have a substantially constant thickness which allows the lens to molded quickly and inexpensively. The single lens 26 in the collection path eliminates the need for expensive coated optics such as focusing mirrors.

Figure 4:
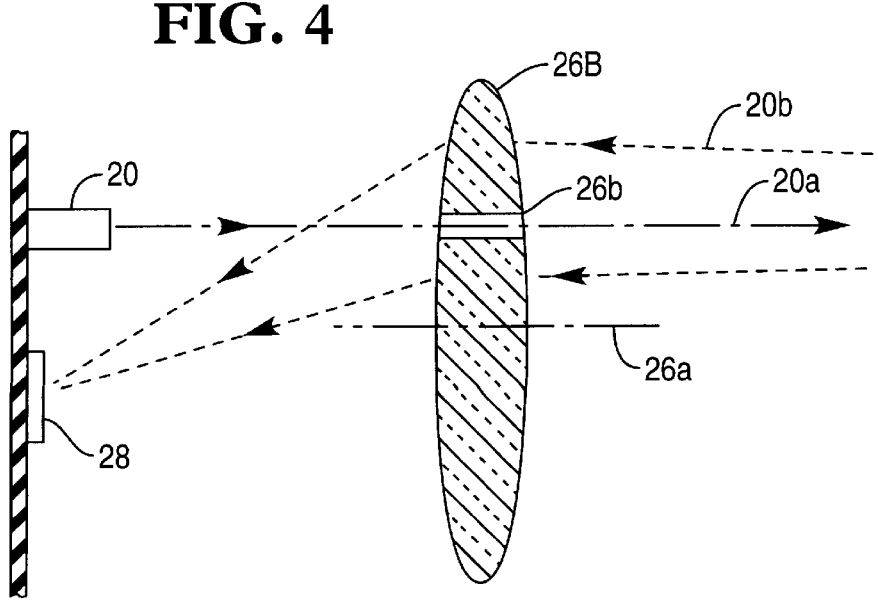
FIG. 4 is a collection lens in the form of a biconvex lens laterally offset from the laser in a second embodiment of the present invention.

FIG. 4 illustrates an alternate embodiment of the collection lens in the form of a biconvex lens designated 26B having its bypass hole 26b spaced radially outwardly from its optical axis 26a. A biconvex lens 26B is symmetrical about its optical axis 26a which extends through its center, and the lower portion of the lens may be eliminated if desired since it is nonfunctioning.

In the FIGS. 3 and 4 embodiments of the invention, the focusing collection lenses 26, 26B are aligned in both the outbound and inbound optical paths with their optical axes 26a laterally offset from the outbound laser beam 20a. The offset focusing lenses therefore use only half-portions thereof optically aligned with the entire lateral extent of the inbound scattered light 20b to focus and divert that light away from the outbound beam 20a for imaging upon the detector 28.

The single laterally offset focusing lens 26, 26B effects a substantial reduction in complexity of the collection path in a laser barcode scanner. The scanner, therefore, may have any other conventional configuration, and may use the single collection lens 26, 26B to advantage in simplifying the scanner, reducing parts count thereof, and reducing associated costs while still providing effective collection and decoding capability.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A scanner for scanning a barcode comprising:

a laser for projecting a laser beam in an outbound path at said barcode, and effecting back scattered light therefrom in an opposite inbound path;

a collection lens optically aligned with said laser in both said outbound and inbound paths, and having an optical axis laterally offset from said laser; and a detector laterally offset from said laser, and optically aligned with said lens for receiving said scattered light therefrom.

2. A scanner according to claim 1 wherein:

said lens includes a bypass hole extending therethrough and laterally offset from said optical axis; and said bypass hole is optically aligned with said laser in both said outbound and inbound paths to pass said laser beam outbound without obstruction, with said lens being effective for focusing said scattered light inbound onto said detector.

3. A scanner according to claim 2 wherein said outbound and inbound paths between said lens and barcode are coextensive.

4. A scanner according to claim 3 wherein said outbound and inbound paths comprise:

a rotary spinner having a plurality of mirrored facets optically aligned with said laser; and a pattern mirror optically aligned with said spinner for reflecting said laser beam and scattered light between said spinner and said barcode.

5. A scanner according to claim 4 wherein:

said laser and detector are mounted on a common support laterally offset from each other; and said lens is laterally offset from said laser toward said detector.

6. A scanner according to claim 5 wherein said lens optical axis is parallel with said laser.

7. A scanner according to claim 6 wherein said detector is disposed in part inboard of said lens optical axis.

8. A scanner according to claim 6 wherein said lens is a fresnel lens.

9. A scanner according to claim 8 wherein said fresnel lens includes a plurality of concentric prismatic grooves disposed coaxially with said optical axis, and said bypass hole is spaced radially outwardly therefrom.

10. A scanner according to claim 6 wherein said lens is a biconvex lens, and said bypass hole is spaced radially outwardly from said optical axis.

11. A method for scanning a barcode 12 comprising:

projecting a laser beam in an outbound path at said barcode to back scatter light therefrom in an opposite inbound path;

focusing said scattered light laterally offset from said laser beam for separation therefrom; and detecting said offset scattered light.

12. A method according to claim 11 wherein said outbound and inbound paths are coextensive at least in part.

13. A method according to claim 12 further comprising:

periodically reflecting said laser beam along a spinner outbound path; and additionally reflecting said reflected laser beam to effect a scan line pattern.

* * * * *